United States Patent

[11] 3,537,459

| [72] | Inventor | John B. Thomas |
| | | Avondale Heights, Melbourne, Australia |
| [21] | Appl. No. | 633,960 |
| [22] | Filed | April 26, 1967 |
| [45] | Patented | Nov. 3, 1970 |
| [73] | Assignee | Massey-Ferguson (Australia) Limited |
| | | Sunshine, Victoria, Australia |
| [32] | Priority | May 13, 1966 |
| [33] | | Great Britain |
| [31] | | 21,303/66 |

[54] THRESHING AND SEPARATING MECHANISM FOR COMBINES
5 Claims, 2 Drawing Figs.

[52] U.S. Cl. .................................................. 130/27
[51] Int. Cl. ................................................... A01f 12/28

[50] Field of Search ............................................ 130/27.10, 27.11

[56] References Cited
UNITED STATES PATENTS

| 885,620 | 4/1908 | Huff ............................... | 130/27 |
| 1,191,853 | 7/1916 | Thompson ..................... | 130/27 |
| 1,334,910 | 3/1920 | Kuntz ............................ | 130/27 |
| 2,457,259 | 12/1948 | Moll ............................... | 130/27 |

Primary Examiner—Antonio F. Guida
Attorney—Greenlee and Farris

ABSTRACT: An adjustable threshing and separating mechanism, having a rotary cylinder, a concave and a separator assembly, which allows improved separation of grain from straw of different crops.

Patented Nov. 3, 1970

3,537,459

Inventor
JOHN B. THOMAS
BY
Tweedale & Gerhardt
Attorney

THRESHING AND SEPARATING MECHANISM FOR COMBINES

SUMMARY OF THE INVENTION

The threshing and separating mechanism comprises a rotary cylinder which cooperates with an arcuate concave assembly, the latter having a series of spaced bars parallel to the axis of the cylinder, and a separating grate attached to the rear end of the concave and extending substantially tangentially thereto, said separating grate including a series of spaced bars substantially parallel to the bars on the concave and means for adjusting the effective gap between the bars of the separating grate.

Preferably the separating grate bars are pivotally attached to a stationary frame of the grate and may be rotated into and locked in any selected one of a series of positions to provide the required effective gap.

DESCRIPTION OF THE PREFERRED EMBODIMENT

Figure 1:
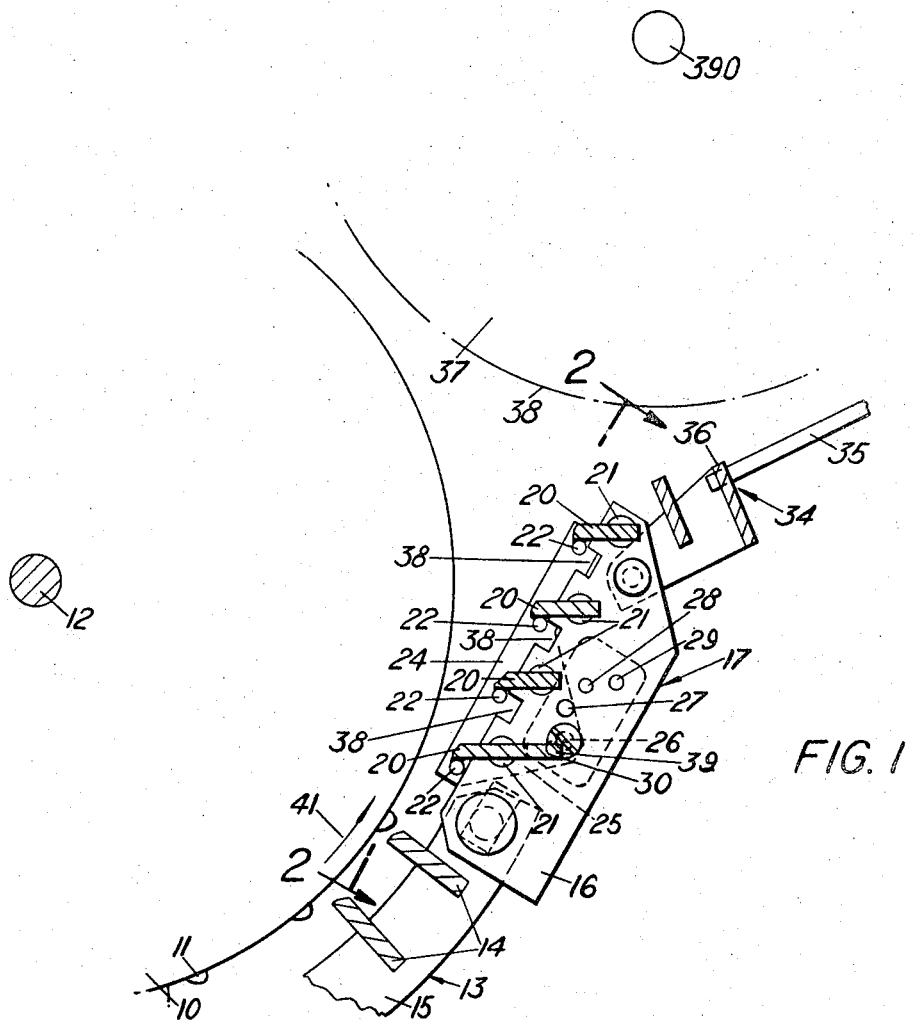
FIG. 1 is a diagrammatic side view, centrally sectioned, of a threshing mechanism according to the invention incorporated in a combine harvester.
Figure 2:
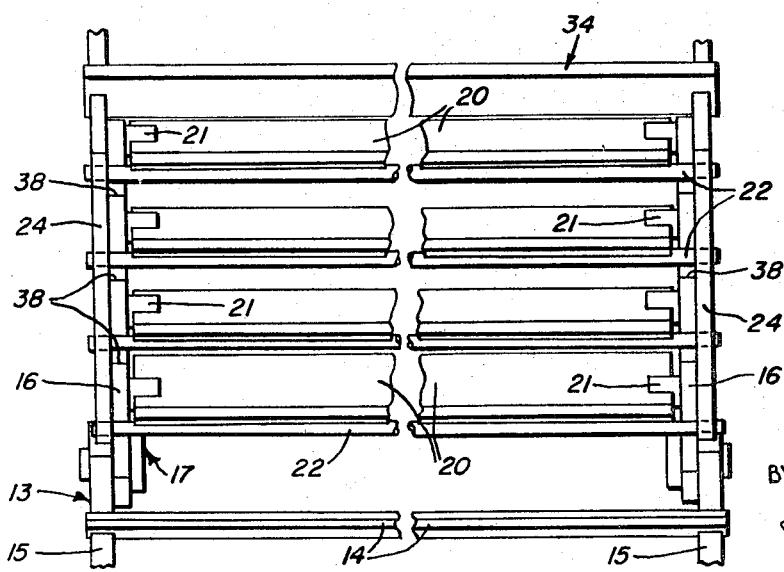
FIG. 2 is a fragmentary section taken along lines 2—2 in FIG. 1.

The threshing and separating mechanism includes a conventional threshing cylinder 10 provided with the usual rub bars 11 at its outer periphery and mounted on a shaft 12 driven in any suitable manner to rotate the cylinder.

Disposed below the cylinder 10 is a conventional concave 13 of arcuate configuration to conform generally to the outer periphery of the cylinder 10 and provided with a series of transverse bars 14 extending parallel to the axis of the shaft 12 and, in operation, cooperating with the rub bars 11 to effect the threshing.

The concave includes two laterally spaced arcuate members 15. A plate 16 is bolted to the inner edge of each member 15 to form one side member of a separating grate 17. The separating grate 17, as clearly illustrated in FIG. 1 extends to the rear of and radially from the arcuate concave 13. Positioned between the plates 16, and pivotally connected thereto are a series of vertically spaced bars 20. Each bar 20 carries two laterally aligned pins 21 disposed on its ends and extending into holes in the plates 16 to form a pivotal connection between the bars 20 and the plates 16.

Each bar 20 is also provided with a further laterally extending pin 22, passing over the top edge of one of the plates 16, and these pins 22 are pivotally mounted in an adjustment member or plate 24 extending along the outside edge of one of the frame plates 16. The adjustment plate 24 has a projecting portion 25 provided with a hole which may be placed in alignment with any one of a series of holes 26, 27, 28 and 29 disposed arcuately in the plate 16. The adjustment plate 24 is normally held in a selected position by a screw 30 passing through the projection 25 and a selected one of the holes 26—29. A similar adjustment plate may also be provided at the opposite side of the assembly to cooperate with a second set of pins 22 on the bars 20 and holes 26—29 in the other plate 16.

A conventional rake 34 comprising a series of laterally spaced rearwardly extending bars 35 carried in a cross member 36 is mounted on the rear end of the separating grate 17. The usual rotary rear beater 37, the peripheral path 38 of which is only diagrammatically illustrated, has its center 390 situated substantially vertically above the rear end of the separating grate 17.

In operation the cylinder 10 is rotated in the direction of the arrow 41, and the material is fed into the threshing mechanism between the cylinder 10 and the concave 13. The rubbing action between the bars 14 on the concave 13 and the rub bars 11 acts to thresh the crop. Most of the grain or seed then passes through the spaces between the bars 14, and the straw, together with any remaining grain, is thrown by the cylinder 10 against the bars 20. This then causes the majority of the remaining grain to pass through the bars 20 and the straw is then received by the rear beater 37 which passes it over the rake 34 and onto the usual straw walkers. As a result of the action of the separator assembly 17 there will now be less grain in the straw than with the usual arrangement whereby the threshed material is passed directly from the concave to the rear beater 37 and over the rake 34. In this way the efficiency of the mechanism is increased.

The degree of action required by the separator 17 varies according to the type of material being threshed and the angle of the bars 20, and hence the effective gap between them is adjustable in the manner previously described to suit various conditions and to prevent overloading of the usual shaker shoe assembly due to the effective gap being too large. In the position shown with the screw 30 passing through the hole 26 the effective gap is a maximum. This gap is effectively reduced by moving the adjustment plate 24 until the screw 30 may be received in either of the holes 27 or 28. In the case where the screw is received in the hole 29 the bars 20 are aligned, and the pins 22 pass into the slots 38 in the upper edge of the plate 16. In this case there is preferably only a small gap between the adjacent edges of the bars 20 so that there is very little, if any, further separating effect on the material. It will also be noted that the lowest bar 20 is provided with an additional part 39 which in this position acts to almost close the gap between this bar and the rear concave bar 14.

I claim:

1. A threshing and separating mechanism including a cylinder mounted to rotate about an axis, an arcuate concave assembly which cooperate with the cylinder to thresh crop material, said concave assembly including a series of spaced bars parallel to the axis of rotation of the cylinder, and a separating grate extending radially from said concave assembly and including a series of spaced bars pivotally mounted on support means adjacent to the rear of the concave assembly and substantially parallel to the spaced bars of the concave assembly and adjustment means to pivot at least some of the pivotally mounted spaced bars of said separating grate to adjust the effective gap between adjacent bars.

2. A threshing and separating mechanism according to claim 1 in which the separating grate bars are pivotally attached to the support means and may be rotated into and locked in any selected one of a series of positions to provide the required effective gap.

3. A threshing and separating mechanism according to claim 2 further comprising an adjustment plate, said adjustment plate being attached to said support means, and wherein the separating grate bars are also pivotally attached to said adjustment plate which is movable relative to said grate to effect equal angular adjustment of all the separating grate bars simultaneously.

4. A threshing and separating mechanism according to claim 2 in which said bars of the separating grate may be rotated into positions in which they lie edge to edge and form a flat surface extending substantially tangentially to said concave.

5. A threshing and separating mechanism according to claim 4 in which, in said positions, the separating grate bar nearest to said arcuate concave assembly terminates closely adjacent to a bar of said concave.